July 22, 1941.  H. WELDON  2,250,074
PORTABLE HEATER
Filed Aug. 19, 1940   2 Sheets-Sheet 1

Inventor
Harry Weldon
By J. Stanley Burch
Attorney

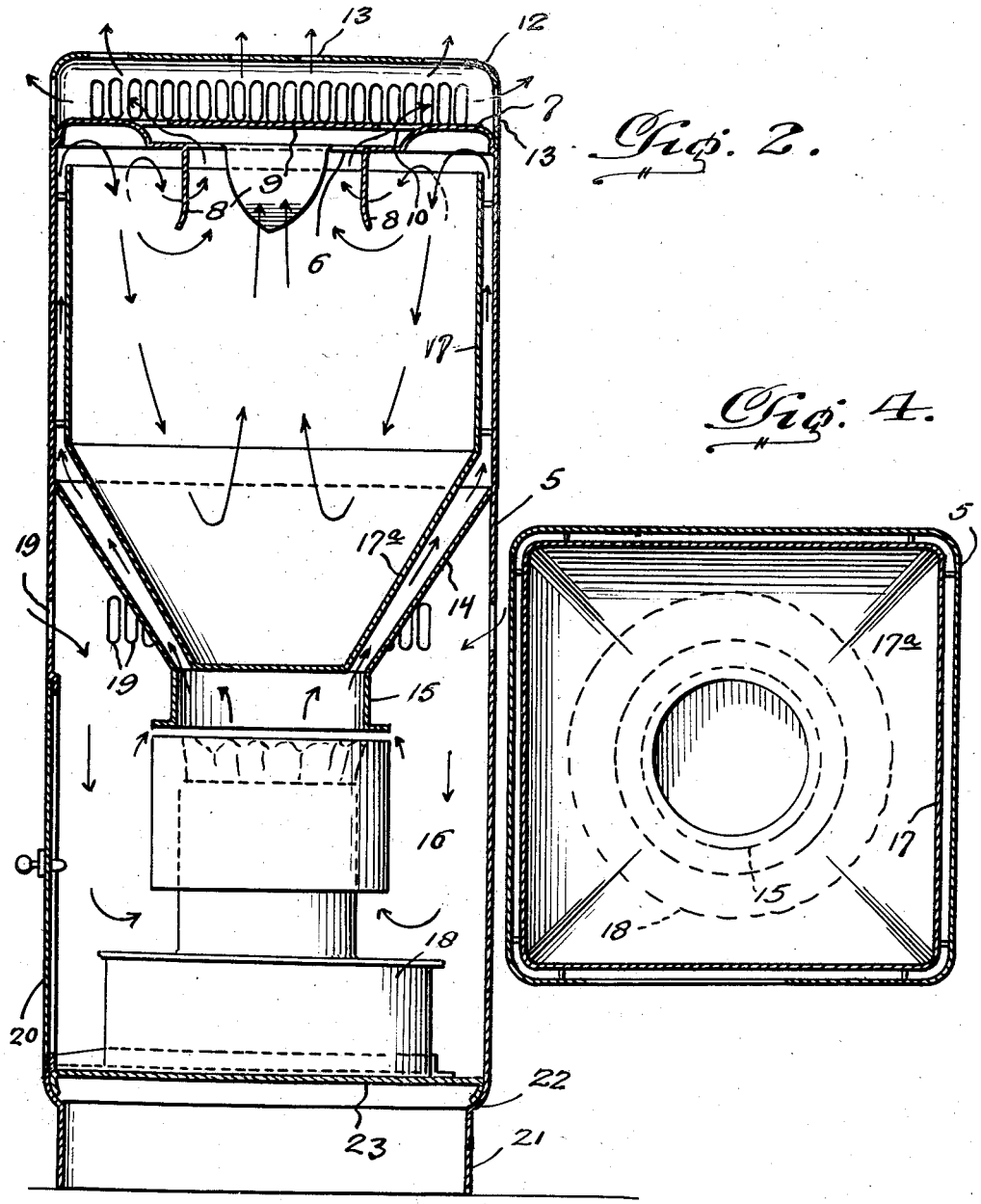

Patented July 22, 1941

2,250,074

UNITED STATES PATENT OFFICE 2,250,074

PORTABLE HEATER

Harry Weldon, San Antonio, Tex.

Application August 19, 1940, Serial No. 353,300

3 Claims. (Cl. 126—96)

This invention relates to an improved portable heater, and the primary object of the invention is to provide means whereby the heated air is caused to flow into contact with the walls of the heater casing so as to provide an efficient radiating surface of relatively large area.

Another important object of the present invention is to provide a heater which is simple in construction and so designed so as to insure maximum heating efficiency.

With the above and other objects in view, the present invention consists in the novel form, combination and arrangement of parts hereinafter more fully described, shown in the accompanying drawings and claimed.

In the drawings:

Figure 2 is a vertical section on line 2—2 of Figure 1;

Figure 4 is a horizontal section taken on line 4—4 of Figure 1.

Figure 1:
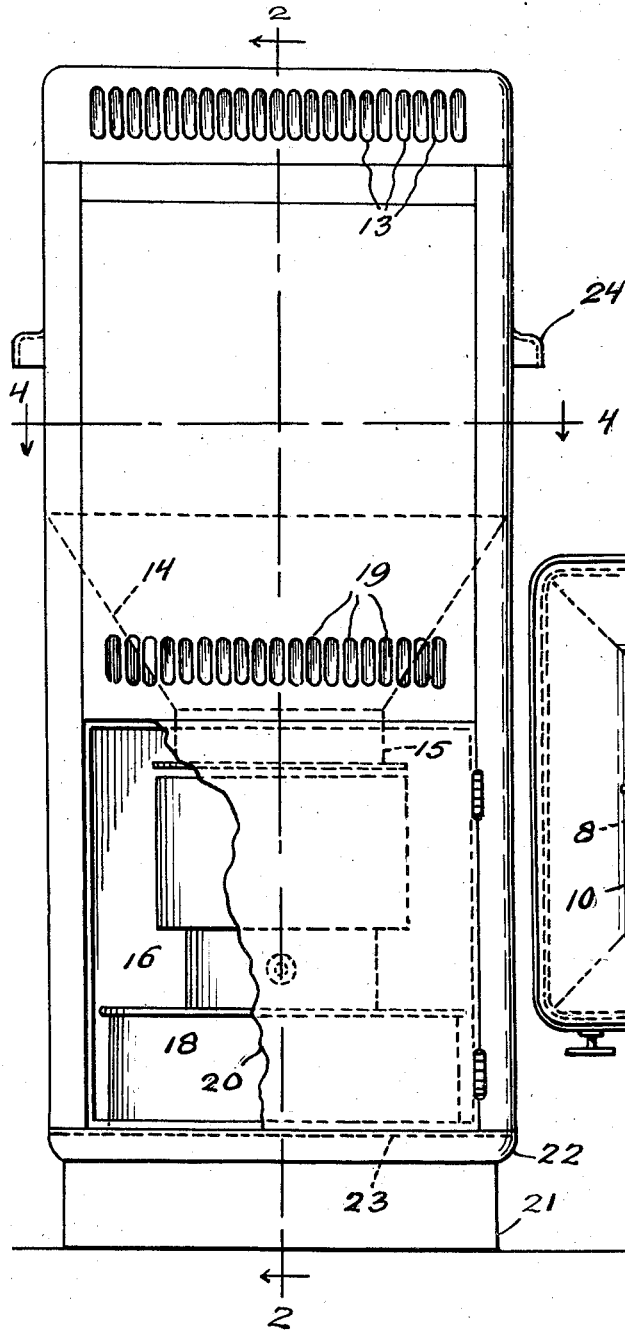
Figure 1 is a front elevational view, partly broken away, of a heater constructed in accordance with the present invention.
Figure 3:
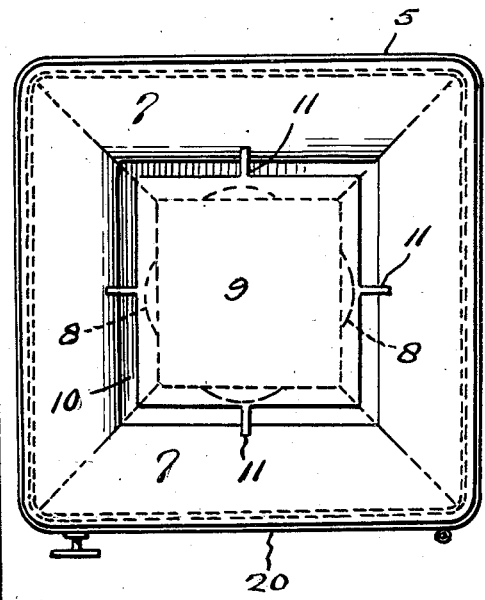
Figure 3 is a top plan view of the heater shown in Figure 1, with the cap section removed.

Referring in detail to the drawings, the present heater includes a vertical or upright tubular casing 5, preferably formed of sheet metal, and being of substantially uniformed cross sectional size from the top to near the bottom thereof. The casing 5 has a top wall provided with a relatively large central opening 6 and having the outer portion thereof upwardly arched in cross section as at 7, suitable hot-air deflectors depending from said top wall at uniformly spaced points about the central opening 6, as at 8. The central portion of the top wall of casing 5 support a flat deflector plate 9 whose edges are spaced from the outer portion of said top wall as at 10 so that escape of the hot-air is permitted, the plate 9 being suitably supported as by means of radial lugs 11 resting on the top wall of the casing and carried by the several side edges of the plate 9. The plate 9 affords a suitable supporting surface for reception of cooking utensils if it is desired to use the heater for cooking purposes.

Removably fitted on the top of the casing 5 is a cap section 12 having suitable openings 13 in the top and sides thereof, such cap section being of inverted pan-shape and serving to conceal the top of the casing and provide a pleasing appearance for the top of the heater when used for heating purposes.

Fitted in the intermediate portion of the casing 5 is a frusto-conical member 14 preferably formed of sheet metal and extending downwardly and inwardly to a point considerably spaced above the bottom of the casing where it terminates in a flanged tubular throat 15. This member divides the casing into a lower burner chamber 16. Fitted in the upper portion of the casing is a tubular member 17 slightly spaced inwardly of the upper portion of the casing and having a frusto-conical lower portion 17a spaced inwardly from the member 14 so as to provide a space between the conical member 14 and the conical portion 17a as well as between the upper portion of the member 17 and the upper portion of the casing 5 through which the heated air is adapted to flow. The top of the member 17 is spaced below the top of the casing 5 so that the heated air may pass inwardly within the member 17, 17a as indicated by the arrows. The upwardly arched outer portion 7 of the top wall of the casing thus causes the heated air to be deflected inwardly and downwardly within the chamber formed within the member 17, 17a, thus insuring maintenance of the latter member in a heated condition by the flow of heated air into the same immediately prior to its outward passage through the top of the casing. As the heated air flows in contact with the member 14 and the sides of the casing 5 at the upper portion of the latter, the surfaces of these portions or members are effectively heated and provide a relatively large radiating surface which insures maximum heating efficiency.

A suitable burner, such as the oil burner 18 may be provided in the lower chamber 16, and the sides of the casing 5 below the member 14 are provided with numerous openings 19 forming air inlets for said chamber 16. This admitted air is heated by the flame of the burner 18 and passes upwardly through the throat 15 and then into and through the space between the members 17, 17a and member 14 and the upper portion of casing 5. The front wall of the casing 5 preferably has a large opening in the lower portion thereof closed by a door 20 so that access to the burner 18 may be had. If an oil burner is used as illustrated, it may be introduced or removed through this opening closed by door 20.

As shown, the lower portion of the casing 5 may be contracted as at 21 so as to provide a shoulder 22 upon which rests and may be secured by welding or the like, a bottom wall 23 forming a support for the burner 18 when such an oil burner is used. All of the parts, except the burner, may be formed of sheet metal economically stamped and assembled. Also, the casing may be provided at opposite sides of its upper portion with suitable hand grips 24 to facilitate lifting the heater and moving it about.

From the foregoing description, it is believed that the construction, as well as the advantages of the present invention will be readily understood and appreciated by those skilled in the art. Minor changes in the various details of construction illustrated and described are contemplated within the spirit and scope of the invention as claimed.

What I claim as new is:

1. A portable heater of the character described, comprising an upright tubular casing having a top wall provided with a relatively large central opening, a frusto-conical member fitted in the intermediate portion of the casing and terminating at its lower end in a tubular hot air inlet, the casing having cold air inlets below said frusto-conical member, a tubular member fitted in the upper portion of the casing and slightly spaced inwardly therefrom, said tubular member having a conical lower portion spaced inwardly from said frusto-conical member and closed at the bottom, the space between the tubular member and the upper portion of the casing and between the frusto-conical lower portion of said tubular member and said frusto-conical member providing a passage on all sides of the casing for the upward flow of heated air in contact with the upper portion of the casing, and a burner within the lower portion of the casing below said frusto-conical member for heating the air admitted in the lower portion of the casing, the top wall of the casing having an outer portion of upwardly arched form in cross section, and deflectors depending from the top wall of the casing at uniformly spaced points about the central opening of said top wall, whereby the heated air may pass into said tubular member from the space between the latter and the upper portion of the casing prior to passing upwardly through the central opening in the top wall of the casing.

2. A portable heater of the character described, comprising an upright tubular casing having a top wall provided with a relatively large central opening, a frusto-conical member fitted in the intermediate portion of the casing and terminating at its lower end in a tubular hot air inlet, the casing having cold air inlets below said frusto-conical member, a tubular member fitted in the upper portion of the casing and slightly spaced inwardly therefrom, said tubular member having a conical lower portion spaced inwardly from said frusto-conical member and closed at the bottom, the space between the tubular member and the upper portion of the casing and between the frusto-conical lower portion of said tubular member and said frusto-conical member providing a passage on all sides of the casing for the upward flow of heated air in contact with the upper portion of the casing, and a burner within the lower portion of the casing below said frusto-conical member for heating the air admitted in the lower portion of the casing, the top wall of the casing having an outer portion of upwardly arched form in cross section, and deflectors depending from the top wall of the casing at uniformly spaced points about the central opening of said top wall, whereby the heated air may pass into said tubular member from the space between the latter and the upper portion of the casing prior to passing upwardly through the central opening in the top wall of the casing, and a deflector plate supported by the top wall of the casing centrally of its opening and in spaced relation to the walls of said opening.

3. A portable heater of the character described, comprising an upright tubular casing having a top wall provided with a relatively large central opening, a frusto-conical member fitted in the intermediate portion of the casing and terminating at its lower end in a tubular hot air inlet, the casing having cold air inlets below said frusto-conical member, a tubular member fitted in the upper portion of the casing and slightly spaced inwardly therefrom, said tubular member having a conical lower portion spaced inwardly from said frusto-conical member and closed at the bottom, the space between the tubular member and the upper portion of the casing and between the frusto-conical lower portion of a passage on all sides of the casing for the upward flow of heated air in contact with the upper portion of the casing, and a burner within the lower portion of the casing below said frusto-conical member for heating the air admitted in the lower portion of the casing, the top wall of the casing having an outer portion of upwardly arched form in cross section, and deflectors depending from the top wall of the casing at uniformly spaced points about the central opening of said top wall, whereby the heated air may pass into said tubular member from the space between the latter and the upper portion of the casing prior to passing upwardly through the central opening in the top wall of the casing, and a removable cap member fitted on the top of the casing and having hot air outlet openings in the sides and top thereof.

HARRY WELDON.